United States Patent
Scholz

(10) Patent No.: US 9,593,748 B2
(45) Date of Patent: Mar. 14, 2017

(54) TRANSMISSION ASSEMBLY FOR A MOTOR VEHICLE AND MOTOR VEHICLE

(71) Applicant: Volkswagen Aktiengesellschaft, Wolfsburg (DE)

(72) Inventor: Norbert Scholz, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 46 days.

(21) Appl. No.: 14/795,110

(22) Filed: Jul. 9, 2015

(65) Prior Publication Data

US 2016/0010728 A1 Jan. 14, 2016

(30) Foreign Application Priority Data

Jul. 9, 2014 (DE) .......................... 10 2014 109 616

(51) Int. Cl.
*F16H 3/66* (2006.01)

(52) U.S. Cl.
CPC ..... *F16H 3/663* (2013.01); *F16H 2200/0065* (2013.01); *F16H 2200/0073* (2013.01); *F16H 2200/201* (2013.01); *F16H 2200/2023* (2013.01); *F16H 2200/2046* (2013.01); *F16H 2200/2048* (2013.01)

(58) Field of Classification Search
CPC .......................... F16H 3/663; F16H 2200/201
See application file for complete search history.

(56) References Cited

U.S. PATENT DOCUMENTS

| | | | | |
|---|---|---|---|---|
| 7,846,058 B2* | 12/2010 | Kim | ......................... | F16H 3/663 475/280 |
| 7,963,876 B2* | 6/2011 | Phillips | ................... | F16H 3/663 475/280 |
| 8,029,405 B2* | 10/2011 | Kim | ......................... | F16H 3/663 475/280 |
| 8,366,580 B2* | 2/2013 | Wittkopp | ................ | F16H 3/663 475/275 |
| 2012/0172172 A1 | 7/2012 | Gumpoltsberger et al. | | |

FOREIGN PATENT DOCUMENTS

| | | |
|---|---|---|
| DE | 10 2009 025 609 A1 | 12/2010 |
| DE | 10 2009 028 724 A1 | 2/2011 |

OTHER PUBLICATIONS

Pickard, Jürgen: Planetengetriebe in automatischen Fahrzeuggetrieben (Planetary gear sets in automatic vehicle transmissions). In: Automobil-Industrie, 1979, Heft4. 41-49.-ISSN 0005-1306.
Search Report for German Patent Application No. 10 2014 109 616.9, dated Jan. 20, 2015.

\* cited by examiner

*Primary Examiner* — Jacob S Scott
*Assistant Examiner* — Tinh Dang
(74) *Attorney, Agent, or Firm* — Pearl Cohen Zedek Latzer Baratz LLP

(57) ABSTRACT

The invention relates to a 9-speed transmission made up of two simple planetary gear sets including a drive group and an output group designed as a Ravigneaux set having six shift elements, namely three clutches and three brakes, certain specific embodiments being expandable to form an 11-speed transmission by adding a fourth brake.

9 Claims, 3 Drawing Sheets

TRANSMISSION ASSEMBLY FOR A MOTOR VEHICLE AND MOTOR VEHICLE

CROSS-REFERENCE TO RELATED APPLICATIONS

This application claims priority of German Patent Application No. DE 10 2014 109 616.9, filed Jul. 9, 2014, which is hereby incorporated by reference.

FIELD OF THE INVENTION

The present invention relates to a 9-speed transmission for a motor vehicle, which theoretically is composed of an input-side drive group made up of two simple planetary gear sets and an output group connected to the drive group via two connecting shafts, each including multiple shift elements.

Such a transmission is known both from US 2012/0172172 A1 and from DE 10 2009 025 609 A1.

The output groups of these transmissions and the drive groups are composed of two simple planetary gear sets having associated shift elements. In total, six shift elements are provided, namely three brakes and three clutches. The known transmissions implement a multi-stepped, progressive transmission range of the 9 forward gears where, in each gear, three of the present shift elements are closed and the remaining are open. The disadvantage with the known transmissions is, in part, the very high circumferential speeds which may occur in particular on one of the ring gears of the output group. According to a realistic estimation based on typical stationary gear ratios and transmission dimensions, the ring gear of the output group rotating the fastest may encounter circumferential speeds of 60 m/s to 70 m/s. Such circumferential speeds must be considered borderline even with a very strong (and consequently expensive) design of the elements.

SUMMARY OF THE INVENTION

It is the object of the present invention to refine the known transmissions in such a way that lower the maximum circumferential speeds which occur at a functionally approximately identical behavior.

This object is achieved by a transmission system of the present invention, namely by a transmission system for a motor vehicle including a drive stage coupleable via an input shaft to a drive assembly of the motor vehicle, an output stage connected to the drive stage via a first connecting shaft and a second connecting shaft and couplable to an output of the motor vehicle via an output shaft, and a transmission housing surrounding the drive stage and the output stage, the drive stage including a first planetary gear set having a first sun gear, a first ring gear and a first planet carrier, on which a set of first planet gears is rotatably mounted, which mesh with the first sun gear on the one hand and with the first ring gear on the other hand, a second planetary gear set having a second sun gear, a second ring gear and a second planet carrier, on which a set of second planet gears is rotatably mounted, which mesh with the second sun gear on the one hand and with the second ring gear on the other hand, and a first clutch and a second clutch, with the aid of which in each case two elements of the planetary gear sets of the drive stage are shiftably coupled to each other, and a first brake and a second brake, with the aid of which in each case one element of the planetary gear sets of the drive stage is shiftably coupled to the housing, and the output stage including a Ravigneaux planetary gear set having a first Ravigneaux sun gear, a second Ravigneaux sun gear, a Ravigneaux ring gear and a Ravigneaux planet carrier, on which two sets of Ravigneaux planet gears are rotatably mounted, namely one set of short planet gears and one set of stepped long planet gears having one larger and one smaller long planet stage, of which one long planet stage meshes with the short planet gears, one of the Ravigneaux sun gears meshing with the set of short planet gears, and the Ravigneaux ring gear meshing with one of the sets of Ravigneaux planet gears, and the other of the Ravigneaux sun gears meshing with the long planet stage [and] not meshing with the short planet gears, a third clutch, with the aid of which one element of the Ravigneaux planetary gear set is shiftably coupled to the second connecting shaft, and a third brake, with the aid of which the first Ravigneaux sun gear is shiftably coupled to the housing.

The present invention is based on the basic idea of combining the two simple planetary gear sets of the output group to form one Ravigneaux planetary gear set and of transforming the fastest ring gear of the output group in the known transmissions to one of the sun gears of the Ravigneaux planetary gear set. Due to the very much smaller diameter of the sun gear compared to the ring gear, with an otherwise identical design, considerably lower maximum circumferential speeds arise, which in particular may be below the limiting value of 40 m/s, which is generally considered to be favorable.

The drive group may essentially be retained compared to the above-mentioned prior art; however, it may also be varied in moderation within the scope of the present invention. Variation options also exist within the scope of the present invention for the specific design of the output group.

It shall be noted at this point that, within the scope of the present description, the term "connect" or "connection" is used for fixed connections of two elements which are not detachable during the intended operation. Contrary to this, the term "couple" or "coupling" is used in a more general manner and includes both the above-mentioned connections and couplings which are detachable during the intended operation, the latter in each case being explicitly referred to as "shiftably coupled" if necessary. The term "shift element" within the scope of the present invention includes both "brakes," which in each case shiftably couple a rotating element to the transmission housing, and "clutches," which in each case shiftably couple two elements rotating relative to the transmission housing. This selection of terms shall be understood to be entirely independent of the design of the corresponding elements.

In particular, both the described brakes and the described clutches may be implemented as shiftable free wheels, multi-disk clutches, synchronizers or in another manner, for example. With respect to the expressions "sun gear," "ring gear" and "planet carrier," those skilled in the art will understand that these may refer both to the particular planetary gear set element and the associated shaft, the specific meaning in each case resulting from the context.

The preferred specific embodiments shall be described hereafter in the order of the axial position of the corresponding design engagement option from the transmission input to the transmission output.

Preferably it is provided that the input shaft is connected to the second sun gear and the second connecting shaft. Typically, this is the central shaft of the entire transmission system.

In one first specific embodiment, it is provided with respect to the connections of the planetary gear sets and the arrangement of the shift elements within the drive group that
 the first connecting shaft is connected to the first ring gear, and the first planet carrier is connected to the second ring gear;
 the second sun gear (201) is shiftably coupled to the second planet carrier with the aid of the first clutch;
 the first ring gear is shiftably coupled to the second planet carrier with the aid of the second clutch;
 the second planet carrier is shiftably coupled to the housing with the aid of the first brake; and
 the first sun gear is shiftably coupled to the housing with the aid of the second brake.

Alternatively, it may be provided according to a second specific embodiment that
 the first connecting shaft is connected to the second ring gear, and the second planet carrier is connected to the first ring gear;
 the first planet carrier is shiftably coupled to the second sun gear with the aid of the first clutch;
 the first planet carrier is shiftably coupled to the second ring gear with the aid of the second clutch;
 the first planet carrier is shiftably coupled to the housing with the aid of the first brake; and
 the first sun gear is shiftably coupled to the housing with the aid of the second brake.

Both variants are known from the prior art as a drive group, however in conjunction with an output group which is composed of two simple planetary gear sets.

The two connecting shafts form the output of the drive group and, at the same time, the input of the output group. Those skilled in the art will recognize that these will generally not involve separate shafts, but the customary planetary gear set shafts, which as the only shafts extending between the two groups merely fulfill the function of "connecting shafts" and are therefore referred to in this way here.

The first connecting shaft is preferably connected to the second Ravigneaux sun gear within the output group. In contrast, two preferred specific embodiments are provided for the connection of the second connecting shaft.

A first specific embodiment is characterized in that the Ravigneaux planet carrier is shiftably coupled to the second connecting shaft with the aid of the third clutch. Correspondingly, the output shaft is connected to the Ravigneaux planet carrier in this specific embodiment.

A second specific embodiment is characterized in that the Ravigneaux ring gear is shiftably coupled to the second connecting shaft with the aid of the third clutch. Correspondingly, the output shaft is connected to the Ravigneaux ring gear in this specific embodiment.

Each of the specific embodiments of the drive group discussed here may be combined with each of the specific embodiments of the output group discussed here to form a transmission system according to the present invention. It is thus conceivable to have different drive groups and different output groups available, and to combine them within the meaning of a modular transmission kit by connecting the particular shafts acting as connecting shafts.

If the transmission system according to the present invention is expanded by a fourth brake, an 11-speed transmission can be implemented. In particular, it is provided for this purpose that the drive group includes a fourth brake, with the aid of which the first planet carrier is shiftably coupled to the housing.

The following shifting tables show the activations of the shift elements necessary for setting the individual gears in a 9-speed transmission according to the present invention (Table 1) and in an 11-speed transmission according to the present invention (Table 2). The columns are in each case assigned to one shift element, B1 denoting the first brake, B2 the second brake, B3 the third brake, B4 the fourth brake, K1 the first clutch, K2 the second clutch, and K3 the third clutch. "X" denotes the shift elements which are closed in the particular gear. Open shift elements are denoted by empty cells in the table.

TABLE 1

| Gear | Mode | | | | | |
|---|---|---|---|---|---|---|
| | B1 | B2 | B3 | K1 | K2 | K3 |
| 1st gear | | X | X | | X | |
| 2nd gear | | X | | X | X | |
| 3rd gear | | X | X | X | | |
| 4th gear | | X | X | | | X |
| 5th gear | | X | | X | | X |
| 6th gear | | | | X | X | X |
| 7th gear | | X | | | X | X |
| 8th gear | X | | | | X | X |
| 9th gear | X | X | | | | X |
| Idle | | X | X | | | |
| Reverse | X | X | X | | | |

TABLE 2

| Gear | Mode | | | | | | |
|---|---|---|---|---|---|---|---|
| | B1 | B2 | B3 | B4 | K1 | K2 | K3 |
| 1st gear | | | X | X | | X | |
| 2nd gear | | X | | X | | X | |
| 3rd gear | | | X | | X | X | |
| 4th gear | | X | | X | X | | |
| 5th gear | | X | | X | | | X |
| 6th gear | | X | | | X | | X |
| 7th gear | | | | | X | X | X |
| 8th gear | | X | | | | X | X |
| 9th gear | | | X | | | X | X |
| 10th gear | X | | | | | X | X |
| 11th gear | X | X | | | | | X |
| Idle | | | | X | X | | |
| Reverse | X | X | | X | | | |

BRIEF DESCRIPTION OF THE DRAWINGS

Additional features and advantages of the present invention are derived from the following, specific description and the drawings.

DETAILED DESCRIPTION OF THE INVENTION

Figure 1:
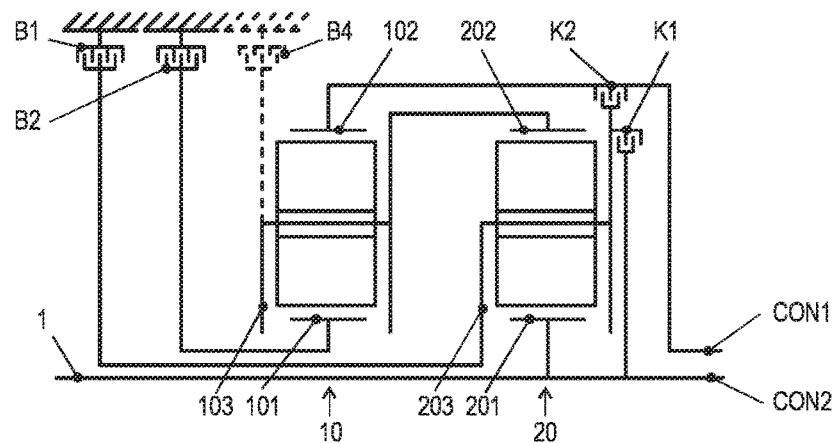
FIG. 1 shows a first specific embodiment of a drive group of a transmission system according to the present invention.

Identical reference numerals in the figures indicate identical or analogous elements.

Figure 2:
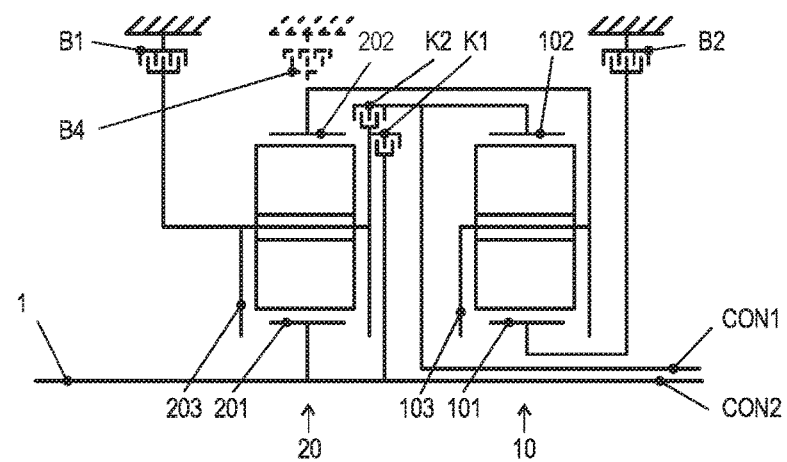
FIG. 2 shows a second specific embodiment of a drive group of a transmission system according to the present invention.
Figure 3:
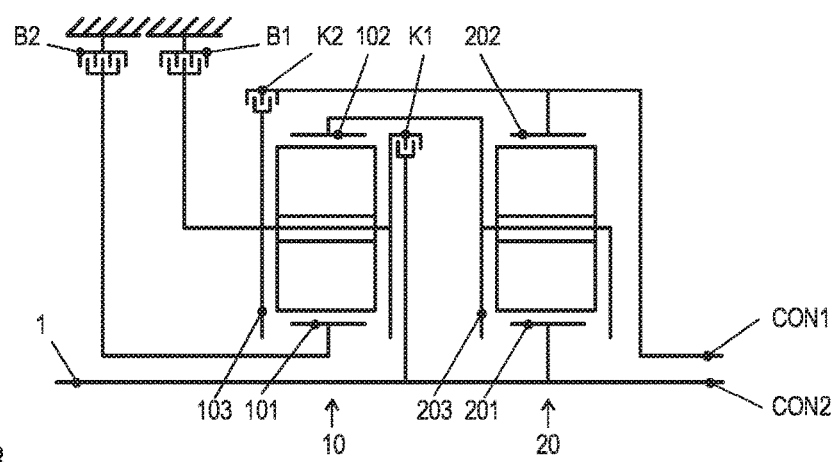
FIG. 3 shows a third specific embodiment of a drive group of a transmission system according to the present invention.

FIGS. 1 through 3 show different specific embodiments of drive groups within a transmission system according to the present invention.

FIGS. 4 through 8 show different specific embodiments of output groups within a transmission system according to the present invention.

Figure 4:
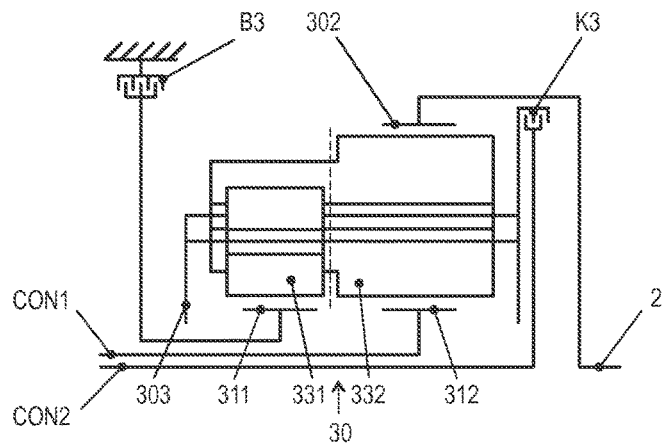
FIG. 4 shows a first specific embodiment of an output group of a transmission system according to the present invention.
Figure 9:
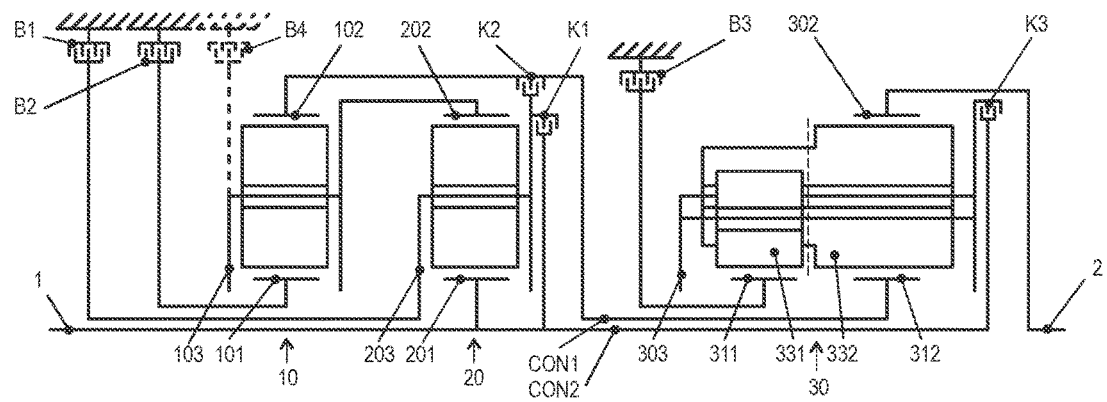
FIG. 9 shows one specific embodiment of a transmission system according to the present invention, composed of one drive group according to FIG. 1 and one output group according to FIG. 4.

FIG. 9 shows, purely by way of example, a transmission system according to the present invention, composed of one drive group according to FIG. 1 and one output group according to FIG. 4. Those skilled in the art will understand that each of the shown drive groups in combination with each of the shown output groups results in a transmission system according to the present invention. The graphic representation of each of the possible combinations may thus be dispensed with. The illustration according to FIG. 9 shall suffice as a representative example.

The drive group according to FIG. 1 includes two simple planetary gear sets, namely a first planetary gear set 10 and a second planetary gear set 20. First planetary gear set 10 includes a first sun gear 101, a first ring gear 102 and a first planet carrier 103, on which a set of first planet gears is rotatably mounted, which mesh with first sun gear 101 on the one hand and with first ring gear 102 on the other hand. Second planetary gear set 20 includes a second sun gear 201, a second ring gear 202 and a second planet carrier 203, on which a set of second planet gears is rotatably mounted, which mesh with second sun gear 201 on the one hand and with second ring gear 202 on the other hand. Planetary gear sets 10, 20 are situated coaxially and axially adjoining each other. The input-side interface of the drive group is formed by the transmission input shaft. The output-side interface of the drive group is formed by two connecting shafts, namely first connecting shaft CON1 and second connecting shaft CON2.

Input shaft 1 is connected to second sun gear 201. The same is connected at the same time to second connecting shaft CON2, so that input shaft 1, second sun gear 201 and second connecting shaft CON2 together form the central shaft of the drive group.

This central shaft is shiftably coupled to second planet carrier 203 via a first clutch K1. At the same time, second planet carrier 203 is shiftably coupled to the housing via a first brake B1. Moreover, second planet carrier 203 is shiftably coupled to first ring gear 102 via a second clutch K2. First ring gear 102 is additionally connected to first connecting shaft CON1.

In addition to this shiftable coupling, a fixed coupling also exists between planetary gear sets 10, 20, namely a connection between first planet carrier 103 and second ring gear 202. First sun gear 101 is shiftably coupled to the housing via a second brake B2. In this configuration, the drive group according to FIG. 1 may be used in combination with any of the output groups described hereafter to create a transmission system according to the present invention, in particular a 9-speed transmission according to the present invention. The connection of the groups takes place in each case via connecting shafts CON1 and CON 2, as is indicated by way of example in FIG. 9.

A further shiftable coupling, which is optionally provided within the scope of the present invention to implement an 11-speed transmission according to the present invention, is shown with a dashed line in FIG. 1. First planet carrier 103 is shiftably coupled to the housing with the aid of the brake referred to here as fourth brake B4.

The drive group according to FIG. 2 represents a pure isomorphism to the drive group of FIG. 1. In particular, the axial sequence of planetary gear sets 10, 20 is inverted. All connections within the drive group correspond to those of the specific embodiment of FIG. 1, so that reference may be made to the description above.

Contrary to the specific embodiment of FIG. 1, the drive group according to FIG. 3 has a fixed connection between second planet carrier 203 and first ring gear 102. First brake B1 shiftably couples first planet carrier 103 to the housing, while second brake B2, as is also the case in the specific embodiment according to FIG. 1, shiftably couples first sun gear 101 to the housing. First clutch K1 shiftably couples first planet carrier 103 to second sun gear 201.

Second clutch K2 shiftably couples first planet carrier 103 to second ring gear 202, which is fixedly connected to first connecting shaft CON1. As is also the case in the specific embodiment of FIG. 1, second connecting shaft CON2 is connected to input shaft 1 and second sun gear 201. In addition, reference may be made to the description above with respect to FIG. 1, an equivalent arrangement of a fourth brake B4 not being possible in this specific embodiment due to the inaccessibility of the second planet carrier.

FIG. 4 shows a first specific embodiment of an output group, which may be connected to any of the drive groups of FIGS. 1 through 3 to create a transmission system according to the present invention. The connection is created via connecting shafts CON1 and CON2; in each case first connecting shaft CON1 of the drive group is to be connected to first connecting shaft CON1 of the output group, and second connecting shaft CON2 of the drive group is to be connected to second connecting shaft CON2 of the output group. All other shown output groups are also based on this concept, so that each shown output group may be combined with each shown drive group to form a transmission system according to the present invention.

The output group according to FIG. 4 includes a Ravigneaux planetary gear set 30 having a first Ravigneaux sun gear 311, a second Ravigneaux sun gear 312, a Ravigneaux ring gear 302 and a Ravigneaux planet carrier 303. One set of short planet gears 331 and one set of long planet gears 332 are rotatably mounted on Ravigneaux planet carrier 303. Long planet gears 332 are designed as stepped planet gears, having one larger stage, i.e., one stage having a larger diameter, and one smaller stage, i.e., one stage having a smaller diameter. In the specific embodiment shown in FIG. 4, short planetary gear set 331 meshes with the smaller stage of long planets gears 332. First Ravigneaux sun gear 311, which is shiftably coupled to the housing via a third brake B3, meshes with the set of short planet gears 331. Second Ravigneaux sun gear 312, which is fixedly connected to first connecting shaft CON1, meshes with the larger stage of long planet gears 332. Ravigneaux ring gear 302 is fixedly connected to transmission output shaft 2. A third clutch K3 shiftably couples Ravigneaux planet carrier 303 to second connecting shaft CON2. In the shown specific embodiment, Ravigneaux planetary gear set 30 is oriented with its small long planet stage in the direction of the drive group.

Figure 5:
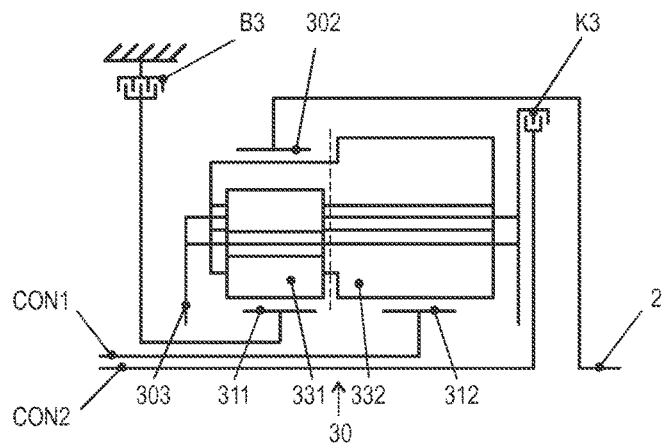
FIG. 5 shows a second specific embodiment of an output group of a transmission system according to the present invention.

FIG. 5 shows a second specific embodiment of an output group, which differs from that of FIG. 4 only in that Ravigneaux ring gear 302 does not mesh with the larger, but with the smaller stage of long planet gears 332. In addition, reference may be made to the description above with respect to FIG. 4.

Figure 6:
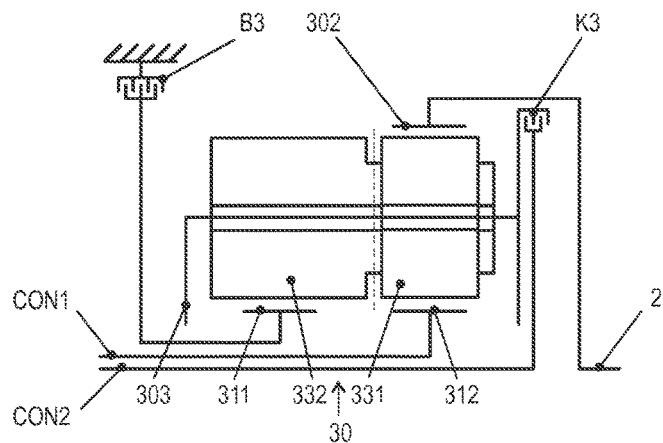
FIG. 6 shows a third specific embodiment of an output group of a transmission system according to the present invention.

FIG. 6 shows a third specific embodiment of an output group, in which Ravigneaux planetary gear set 30 is axially reversed, i.e., oriented with its larger long planet stage in the direction of the drive group. Correspondingly, first Ravigneaux sun gear 311 meshes with the larger long planet stage, and second Ravigneaux sun gear 312 meshes with short planet gears 331. In this specific embodiment, Ravigneaux ring gear 302 also meshes with short planet gears 331. In addition, reference may be made to the description above with respect to FIG. 4.

Figure 7:
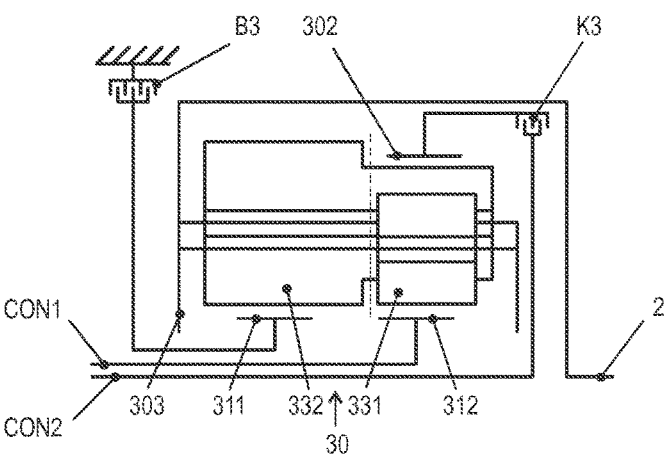
FIG. 7 shows a fourth specific embodiment of an output group of a transmission system according to the present invention.

FIG. 7 shows a fourth specific embodiment of the output group, which differs from the specific embodiment shown in FIG. 6 only in that, instead of Ravigneaux planet carrier 303, Ravigneaux ring gear 302 is shiftably coupled to second connecting shaft CON2 via third clutch K3. Correspondingly, Ravigneaux planet carrier 303, instead of Ravigneaux ring gear 302, is connected to output shaft 2 here. In this specific embodiment, Ravigneaux ring gear 302 meshes with the small stage of long planet gears 332.

Figure 8:
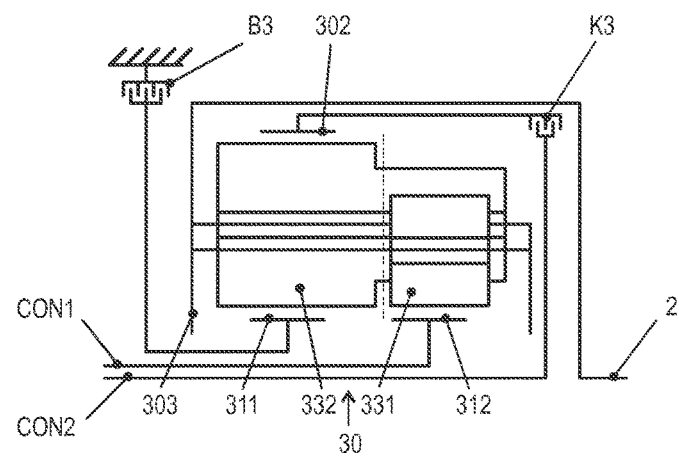
FIG. 8 shows a fifth specific embodiment of an output group of a transmission system according to the present invention.

FIG. 8 shows a fifth specific embodiment of an output group, which differs from that of FIG. 7 only in the point of contact of the Ravigneaux ring gear, which meshes with the large stage of long planet gears 332 here, instead of with the small stage. In addition, this specific embodiment corresponds to that of FIG. 7.

FIG. 9 shows a transmission system according to the present invention composed of one drive group according to FIG. 1 and one output group according to FIG. 4, which is provided purely by way of example and representatively of all remaining combinations of drive and output groups, which those skilled in the art are able to readily carry out. In particular, connecting shafts CON1 and CON2 of the drive and output groups assigned to each other merely have to be connected to each other for such a combination.

Naturally, the specific embodiments discussed in the specific description and shown in the figures represent only illustrative exemplary embodiments of the present invention. In light of the present disclosure, those skilled in the art are provided with a wide range of variation options.

LIST OF REFERENCE NUMERALS 1 input shaft
2 output shaft
10 first planetary gear set
101 first sun gear
102 first ring gear
103 first planet carrier
20 second planetary gear set
201 second sun gear
202 second ring gear
203 second planet carrier
30 Ravigneaux planetary gear set
311 first Ravigneaux sun gear
312 second Ravigneaux sun gear
302 Ravigneaux ring gear
303 Ravigneaux planet carrier
331 short planet gears
332 long planet gears
B1 first brake
B2 second brake
B3 third brake
B4 fourth brake
K1 first clutch
K2 second clutch
K3 third clutch
CON1 first connecting shaft
CON2 second connecting shaft

The invention claimed is:

1. A transmission system for a motor vehicle, comprising:
a drive stage configured to be coupled to a drive assembly of the motor vehicle via an input shaft (1),
an output stage connected to the drive stage via a first connecting shaft (CON1) and a second connecting shaft (CON2) and configured to be coupled to an output of the motor vehicle via an output shaft, and
a transmission housing surrounding the drive stage and the output stage, the drive stage comprising:
  a first planetary gear set (10) having a first sun gear (101), a first ring gear (102) and a first planet carrier (103) on which a set of first planet gears is rotatably mounted, said set of first planet gears being configured to mesh with the first sun gear (101) on a first side of the first planet carrier and with the first ring gear (102) on a second side of the first planet carrier,
  a second planetary gear set (20) having a second sun gear (201), a second ring gear (202) and a second planet carrier (203) on which a set of second planet gears is rotatably mounted, said set of second planet gears being configured to mesh with the second sun gear (201) on a first side of the second planet carrier and with the second ring gear (202) on a second side of the second planet carrier, and
  a first clutch (K1) and a second clutch K2), each configured to shiftably couple one element of each of the first and second planetary gear sets (10, 20) of the drive stage to each other, and a first brake (B1) and a second brake (B2), each configured to shiftably couple one element of each of the first and second planetary gear sets (10, 20) of the drive stage to the housing,
wherein the output stage comprises:
  a Ravigneaux planetary gear set (30) having a first Ravigneaux sun gear (311), a second Ravigneaux sun gear (312), a Ravigneaux ring gear (302) and a Ravigneaux planet carrier (303) on which two sets of Ravigneaux planet gears are rotatably mounted, namely one set of short planet gears (331) and one set of stepped long planet gears (332) having one larger and one smaller long planet stage, wherein one long planet stage meshes with the short planet gears (331), one of the first or second Ravigneaux sun gears (311, 312) meshes with the set of short planet gears (331), and the Ravigneaux ring gear (302) meshes with one of the sets of Ravigneaux planet gears (331, 332), and the other of the Ravigneaux sun gears (312, 311) meshes with the long planet stage that is not meshing with the short planet gears (331), a third clutch (K3) configured to shiftably couple one element of the Ravigneaux planetary gear set (30) to the second connecting shaft (CON2), and a third brake (B3) configured to shiftably couple the first Ravigneaux sun gear (311) to the housing.

2. The transmission system as recited in claim 1, wherein the input shaft (1) is connected to the second sun gear (201) and the second connecting shaft (CON2).

3. The transmission system as recited in claim 1, wherein:
the first connecting shaft (CON1) is connected to the first ring gear (102), and the first planet carrier (103) is connected to the second ring gear (202);
the second sun gear (201) is shiftably coupled to the second planet carrier (203) via the first clutch (K1);
the first ring gear (102) is shiftably coupled to the second planet carrier (203) via the second clutch (K2);
the second planet carrier (203) is shiftably coupled to the housing via the first brake (B1); and
the first sun gear (101) is shiftably coupled to the housing via the second brake.

4. The transmission system as recited in claim 1, wherein:
the first connecting shaft (CON1) is connected to the second ring gear (202), and the second planet carrier (203) is connected to the first ring gear (102);
the first planet carrier (103) is shiftably coupled to the second sun gear (201) via the first clutch (K1);
the first planet carrier (103) is shiftably coupled to the second ring gear (202) via the second clutch (K2);
the first planet carrier (103) is shiftably coupled to the housing via the first brake (B1); and
the first sun gear (101) is shiftably coupled to the housing via the second brake (B2).

5. The transmission system as recited in claim 1, wherein the first connecting shaft (CON1) is connected to the second Ravigneaux sun gear (312).

6. The transmission system as recited in claim 1, wherein:
the Ravigneaux planet carrier (303) is shiftably coupled to the second connecting shaft (CON2) via the third clutch (K3); and
the output shaft (2) is connected to the Ravigneaux ring gear (302).

7. The transmission system as recited in claim 1, wherein:
the Ravigneaux ring gear (302) is shiftably coupled to the second connecting shaft (CON2) via the third clutch (K3); and
the output shaft (2) is connected to the Ravigneaux planet carrier (303).

8. The transmission system as recited in claim 1, wherein the drive group includes a fourth brake shiftably coupled to the housing via the first planet carrier (103).

9. A motor vehicle comprising a drive train comprising:
the transmission system according to claim 1, which, on the input side, is coupled via an input shaft (1) to the drive assembly, and, on the output side, is coupled via the output shaft (2) to the output,
wherein the input shaft (1) is connected to the first planet carrier and the output shaft (2) is connected to the fourth planet carrier.

\* \* \* \* \*